United States Patent
Marupaduga (10) Patent No.: US 11,363,513 B1
(45) Date of Patent: Jun. 14, 2022

(54) PROACTIVE CONTROL OF UE SERVICE BASED ON QUALITY OF AN ACCESS NODE'S RF-CIRCUITRY AS TO FREQUENCY BANDS ON WHICH THE ACCESS NODE OPERATES IN COVERAGE ZONES THROUGH WHICH THE UE IS PREDICTED TO MOVE

(71) Applicant: Sprint Spectrum L.P., Overland Park, KS (US)

(72) Inventor: Sreekar Marupaduga, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 8 days.

(21) Appl. No.: 17/247,562

(22) Filed: Dec. 16, 2020

(51) Int. Cl.
| | |
|---|---|
| *H04W 4/00* | (2018.01) |
| *H04W 36/14* | (2009.01) |
| *H04W 28/02* | (2009.01) |
| *H04W 36/18* | (2009.01) |
| *H04W 36/32* | (2009.01) |

(52) U.S. Cl.
CPC ....... *H04W 36/14* (2013.01); *H04W 28/0268* (2013.01); *H04W 36/18* (2013.01); *H04W 36/32* (2013.01)

(58) Field of Classification Search
CPC . H04W 36/14; H04W 28/0268; H04W 36/18; H04W 36/32
USPC .......................................... 370/331; 455/312
See application file for complete search history.

(56) References Cited

U.S. PATENT DOCUMENTS

| | | |
|---|---|---|
| 8,630,643 B2 | 1/2014 | Weng et al. |
| 9,433,009 B1 | 8/2016 | Marupaduga et al. |
| 9,999,052 B1 | 6/2018 | Marupaduga et al. |
| 10,271,343 B2 | 4/2019 | Behravan et al. |
| 10,582,501 B1 | 3/2020 | Marupaduga et al. |
| 2002/0155827 A1 | 10/2002 | Agrawal et al. |
| 2002/0188723 A1 | 12/2002 | Choi et al. |
| 2002/0191703 A1 | 12/2002 | Ling et al. |
| 2004/0147263 A1 | 7/2004 | Schwarz et al. |
| 2007/0098007 A1 | 5/2007 | Prodan et al. |
| 2008/0225931 A1 | 9/2008 | Proctor et al. |
| 2012/0270537 A1 | 10/2012 | Weng et al. |
| 2013/0028147 A1 | 1/2013 | Black |
| 2013/0157660 A1 | 6/2013 | Awad et al. |
| 2013/0244665 A1 | 9/2013 | Clevorn et al. |
| 2013/0273860 A1 | 10/2013 | Pehlke |
| 2014/0064199 A1 | 3/2014 | Pan et al. |

(Continued)

*Primary Examiner* — Marcos Batista (57) ABSTRACT

A mechanism for controlling service of a user equipment device (UE), including (i) predicting that the UE will move sequentially through multiple zones of coverage of an access node that operates on a different respective set of one or more frequency bands in each zone of coverage and that has a respective radio-frequency (RF) circuitry quality as to each frequency band, (ii) based on the predicting, determining an RF-circuitry-quality score of the access node as an aggregate of the RF-circuitry-qualities of the access node as to the frequency bands on which the access node operates in the multiple zones of coverage through which the UE is predicted to move, and (iii) before the predicted movement of the UE through the multiple zones of coverage occurs, proactively using the determined RF-circuitry-quality score of the access node as a basis to control whether the UE is served by the access node.

20 Claims, 5 Drawing Sheets

(56) References Cited

U.S. PATENT DOCUMENTS

| | | |
|---|---|---|
| 2014/0281819 A1 | 9/2014 | Wood et al. |
| 2014/0307638 A1 | 10/2014 | Zacharias et al. |
| 2015/0103774 A1 | 4/2015 | Nagata et al. |
| 2017/0026074 A1 | 1/2017 | King et al. |
| 2017/0063404 A1 | 3/2017 | Langer et al. |
| 2017/0086049 A1* | 3/2017 | Vrzic .................... H04W 36/18 |
| 2018/0123562 A1 | 5/2018 | Bradley |
| 2018/0189426 A1 | 7/2018 | Turner et al. |
| 2019/0173543 A1 | 6/2019 | Ganesan et al. |

* cited by examiner

PROACTIVE CONTROL OF UE SERVICE BASED ON QUALITY OF AN ACCESS NODE'S RF-CIRCUITRY AS TO FREQUENCY BANDS ON WHICH THE ACCESS NODE OPERATES IN COVERAGE ZONES THROUGH WHICH THE UE IS PREDICTED TO MOVE

BACKGROUND

A typical wireless communication system includes a number of access nodes that are configured to provide coverage in which user equipment devices (UEs) such as cell phones, tablet computers, machine-type-communication devices, tracking devices, embedded wireless modules, and/or other wirelessly equipped communication devices (whether or not user operated), can operate. Further, each access node could be coupled with a core network that provides connectivity with various application servers and/or transport networks, such as the public switched telephone network (PSTN) and/or the Internet for instance. With this arrangement, a UE within coverage of the system may be able to engage in air-interface communication with an access node and could thereby communicate via the access node with various application servers and other entities.

Such a system could operate in accordance with a particular radio access technology (RAT), with communications from an access node to UEs defining a downlink or forward link and communications from the UEs to the access node defining an uplink or reverse link.

Over the years, the industry has developed various generations of RATs, in a continuous effort to increase available data rate and quality of service for end users. These generations have ranged from "1G," which used simple analog frequency modulation to facilitate basic voice-call service, to "4G"—such as Long Term Evolution (LTE), which now facilitates mobile broadband service using technologies such as orthogonal frequency division multiplexing (OFDM) and multiple input multiple output (MIMO). And recently, the industry has completed initial specifications for "5G" and particularly "5G NR" (5G New Radio), which may use a scalable OFDM air interface, advanced channel coding, massive MIMO, beamforming, and/or other features, to support higher data rates and countless applications, such as mission-critical services, enhanced mobile broadband, and massive Internet of Things (IoT).

In accordance with the RAT, each access node could be configured to provide coverage and service on a number of radio-frequency (RF) carriers. Each such carrier could be frequency division duplex (FDD), with separate frequency channels for downlink and uplink communication, or time division duplex (TDD), with a single frequency channel multiplexed over time between downlink and uplink use. And each such frequency channel could be defined as a specific range of frequency (e.g., in RF spectrum) having a bandwidth (width in frequency) and a center frequency and thus extending from a low-end frequency to a high-end frequency.

On the downlink and uplink, the coverage provided by an access node on each such carrier could define an air interface configured in a specific manner to provide physical resources for carrying information wirelessly between the access node and UEs.

Without limitation, for instance, the air interface could be divided over time into a continuum of frames, subframes, and symbol time segments, and over frequency into subcarriers that could be modulated to carry data. The example air interface could thus define an array of time-frequency resource elements each being at a respective symbol time segment and subcarrier, and the subcarrier of each resource element could be modulated to carry data. Further, in each subframe or other transmission time interval, the resource elements on the downlink and uplink could be grouped to define physical resource blocks (PRBs) that the access node could allocate as needed to carry data between the access node and served UEs. In addition, certain resource elements on the example air interface could be reserved for special purposes.

Each carrier could be defined within an industry standard frequency band, by its frequency channel(s) being defined within the frequency band. Examples of such frequency bands include, without limitation, (i) Band 25, which supports FDD carriers and extends from 1850 MHz to 1915 MHz on the uplink and 1930 MHz to 1995 MHz on downlink, (ii) Band 26, which supports FDD carriers and extends from 814 MHz to 849 MHz on the uplink and 859 MHz to 894 MHz on the downlink, (iii) Band 71, which supports FDD carriers and extends from 663 MHz to 698 MHz on the uplink and 617 MHz to 652 MHz on the downlink, (iv) Band 41, which supports TDD carriers and extends from 2496 MHz to 2690 MHz, (v) Band n260, which supports TDD carriers and extends from 27 GHz to 40 GHz, and (vi) Band n261, which supports TDD carriers and extends from 27.5 GHz to 28.35 GHz.

An access node could therefore be configured to operate on multiple such frequency bands, by being configured to provide coverage and service on carriers defined in the multiple frequency bands.

Overview

To facilitate operating on multiple frequency bands, an access node could be equipped with a set of RF circuitry respectively per frequency band. For instance, separately for each frequency band, the access node could have a respective group of antennas that the access node is set to use for air-interface communication in the frequency band. And separately for each frequency band, the access node could have associated components, such as antenna ports, RF filters, combiners, diplexers, triplexers, and jumper cables, among others, that the access node uses to process and convey RF signals of the frequency band to and from the group of antennas. Other per-frequency-band arrangements could be possible as well.

In practice, the access node's RF circuitry per frequency band could have a respective level of quality defining how well the RF circuitry supports RF communication in the frequency band. Relatively high quality RF circuitry could correlate with relatively low signal degradation, which could in turn correlate with higher quality communication. Whereas, relatively low quality RF circuitry could correlate with relatively high signal degradation, which could in turn correlate with lower quality communication. Without limitation, two example metrics related to quality of an access node's RF circuitry per frequency band are port-to-port isolation and insertion loss.

An access node's port-to-port isolation as to a given frequency band is a measure of how well one or more antenna ports associated with the access node's communication on that frequency band could withstand, minimize, or eliminate RF interference, such as cross-coupling, from one or more other antenna ports associated with the access node's communication on one or more other frequency bands, and might be represented as a ratio of power fed to the other ports to power received by the ports at issue. Such interference could arise due to imperfections in associated filters or the like, and could result in RF signal degradation. Based on factors such as physical proximity of antenna ports, proximity of frequency bands, and design of associated filters and other components, the access node could have a defined level of port-to-port isolation respectively for each of the access node's frequency bands, which could differ per band. This level of port-to-port isolation could be indicated by manufacturer specifications and/or determined through manual or automated analysis and could be recorded for reference.

Further, an access node's insertion loss as to as to a given frequency band is a measure of attenuation or loss in signal power resulting from the inclusion (insertion) of one or more components in the access node's RF communication path as to that frequency band. For instance, the inclusion of one or more RF filters, combiners, diplexers, triplexers, antenna ports, jumper cables or other components to feed the access node's RF communication on the frequency band could individually or cooperatively introduce signal loss as to the access node's communication on that band. Based on various factors, the access node could similarly have a defined level of insertion loss respectively for each of the access node's frequency bands, which could also differ per frequency band. And this insertion loss per frequency band could also be indicated by manufacture specifications and/or determined by manual or automated analysis and could be recorded for reference.

In addition, if an access node operates on multiple different frequency bands, the access node might provide multiple zones of coverage that differ from each other at least by how far they extend geographically from the access node (e.g., from a common antenna array of the access node). This difference between geographic ranges of the access node's zones of coverage could stem from the fact that lower frequency signals have lower path loss and therefore tend to propagate farther from the access node than higher frequency signals at the same transmission power. Thus, if the access node operates on both a high-frequency band and a low-frequency band, the access node's coverage on the high-frequency band would likely extend a shorter distance from the access node than the access node's coverage on the low-frequency band.

Figure 1:
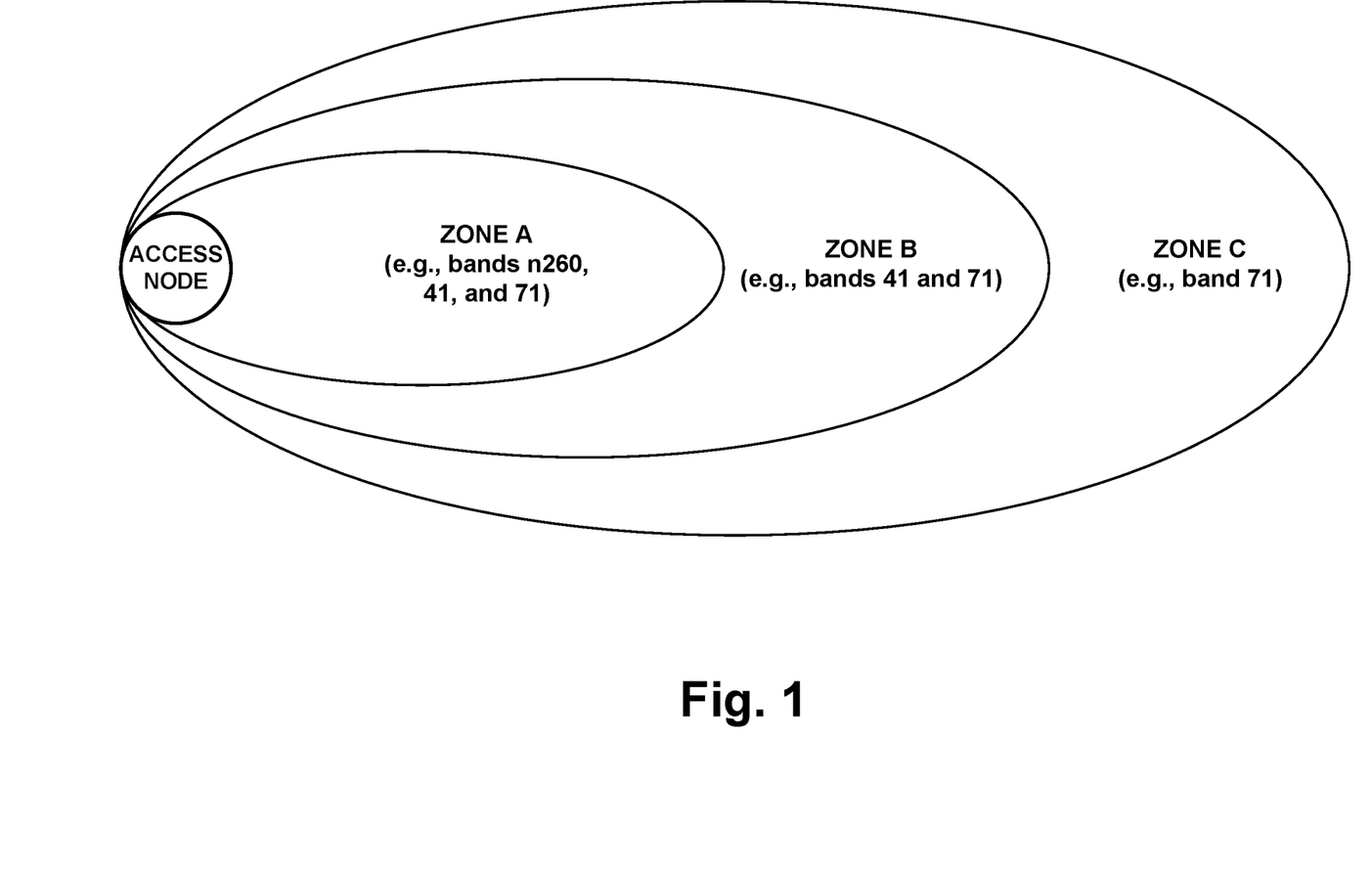
FIG. 1 is an example illustration of multiple zones of coverage provided by an access node, where the access node operates on a different set of frequency bands respectively in each zone of coverage.

FIG. 1 illustrates an example of this, without limitation, in a scenario where an access node operates on a band-71 carrier (in the frequency range 617 MHz to 698 MHz), a band-41 carrier (in the frequency range 2496 MHz to 2690 MHz), and a band n260 carrier (in the frequency range 27 GHz to 40 GHz). In this scenario, the band-71 carrier has some level of path loss, the band-41 carrier has a higher level of path loss than the band-71 carrier, and the band-n260 carrier has a higher level of path loss than the band-41 carrier. Therefore, as shown in FIG. 1, the access node may have at least three zones of coverage, A, B, and C, with the access node operating on a different set of frequency bands respectively in each zone than in each other zone.

Namely, Zone A would extend from the access node to as far away as the access node can effectively provide service on the band-n260 carrier, and in Zone A the access node could provide service on the band-n260 carrier, the band-41 carrier, and the band-71 carrier. Zone B would then extend from the distant edge of Zone A to as far away as the access node can effectively provide service on the band-41 carrier, and in Zone B the access node could provide service on the band-41 carrier and the band-71 carrier but not on the band-n260 carrier. And Zone C would extend from the distant edge of Zone B to as far away as the access node can effectively provide service on the band-71 carrier, and in Zone C the access node could provide service on the band-71 carrier but not on the band-41 carrier or the band-n260 carrier. Other reasons for and arrangements of zones of coverage of an access node each encompassing a different set of frequency bands than each other could be possible as well.

When a UE enters into coverage of an example network including one or more such access nodes, the UE could detect threshold strong coverage of an access node on a carrier in a given frequency band, such as by detecting a threshold strong reference signal broadcast by the access node on that carrier. And the UE could then engage in random-access and connection signaling, such as Radio Resource Control (RRC) signaling, with the access node to establish an air-interface connection (e.g., RRC connection) through which the access node will then serve the UE on that carrier. Further, the access node could establish in data storage a context record for the UE, noting the carrier on which the UE is connected and noting associated service information.

In addition, if the UE is not already registered for service with the core network, the UE could transmit to the access node an attach request, which the access node could forward to a core-network controller for processing. And the core-network controller and access node could then coordinate setup for the UE of one or more user-plane bearers, each of which could include (i) an access-bearer portion that extends between the access node and a core-network gateway system that provides connectivity with a transport network and (ii) a data-radio-bearer portion that extends over the air between the access node and the UE.

Once the UE is connected and registered, the access node could then serve the UE in a connected mode over the air-interface connection, managing downlink air-interface communication of packet data to the UE and uplink air-interface communication of packet data from the UE.

For instance, when the core-network gateway system receives user-plane data for transmission to the UE, the data could flow to the access node, and the access node could buffer the data, pending transmission of the data to the UE. With the example air-interface configuration noted above, the access node could then allocate downlink PRBs in an upcoming subframe for carrying at least a portion of the data, defining a transport block, to the UE. And the access node could transmit to the UE in a control region of that subframe a Downlink Control Information (DCI) scheduling directive that designates the allocated PRBs, and the access node could accordingly transmit the transport block to the UE in those designated PRBs.

Likewise, on the uplink, when the UE has user-plane data for transmission on the transport network, the UE could buffer the data, pending transmission of the data to the access node, and the UE could transmit to the access node a scheduling request that carries a buffer status report (BSR) indicating the quantity of data that the UE has buffered for transmission. With the example air-interface configuration noted above, the access node could then allocate uplink PRBs in an upcoming subframe to carry a transport block of the data from the UE and could transmit to the UE a DCI scheduling directive that designates those upcoming PRBs. And the UE could accordingly transmit the transport block to the access node in the designated PRBs.

For each such transmission on the downlink and the uplink, the receiving end (i.e., the UE or the access node) could determine whether it received the transport block successfully from the transmitting end (i.e., the access node or the UE). For instance, the transmission could carry a cyclic redundancy check (CRC) value computed based on the transport block, and the receiving end could compute a CRC based on the received transport block and determine whether its computed CRC matches that carried by the transmission. If the receiving end receives the transmission and determines that the CRC matches, then the receiving end could transmit to the transmitting end a positive acknowledgement (ACK) control message. Whereas, if the receiving end does not receive the transmission or determines that the CRC does not match and thus that there was an error in the received transport block, then the receiving end could transmit to the transmitting end a negative acknowledgement (NACK), in response to which the transmitting end could then attempt retransmission.

If the access node with which a UE connects is configured to operate on multiple different frequency bands, the access node might provide multiple zones of coverage as noted above, with the access node operating on a different set of frequency bands respectively in each zone of coverage. Therefore, the set of frequency bands on which the access node could possibly serve the UE would depend on which zone of coverage of the access node the UE is physically positioned in.

For at least this reason, if the UE is connected with the access node on a given frequency band and the UE moves between the access node's zones of coverage, the access node may dynamically switch the UE from being connected with the access node on that frequency band to instead being connected with the access node on another frequency band.

By way of example, in the arrangement above, if the UE is connected with the access node on band 71 in Zone B and the UE moves from Zone B to Zone A, the access node might transition the UE from being connected with the access node on band 71 to being connected with the access node instead on band n260—both because band n260 has become available to the UE and perhaps because a carrier in band n260 may be wider bandwidth supporting higher peak data rate. And as another example, if the UE is connected with the access node on band 41 in Zone B and the UE moves from Zone B to Zone C, the access node might transition the UE from being connected with the access node on band 41 to instead being connected with the access node on band 71, because, in Zone C, the access node operates on band 71 but not on band 41. Other examples are possible as well.

The present disclosure leverages the above principles to help control whether a UE will be served by a given access node. In particular, the disclosure addresses a scenario where an access node has multiple zones of coverage and operates on a different respective set of one or more frequency bands in each zone of coverage than in each other zone of coverage. In this scenario, the disclosure provides for predicting that the UE will move through a sequence of those zones of coverage of the access node and, based on the prediction, proactively controlling whether the UE is served by the access node, with the controlling being based on the access node's RF-circuitry quality as to the frequency bands on which the access node operates in the zones of coverage through which the UE is predicted to move.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

Figure 2:
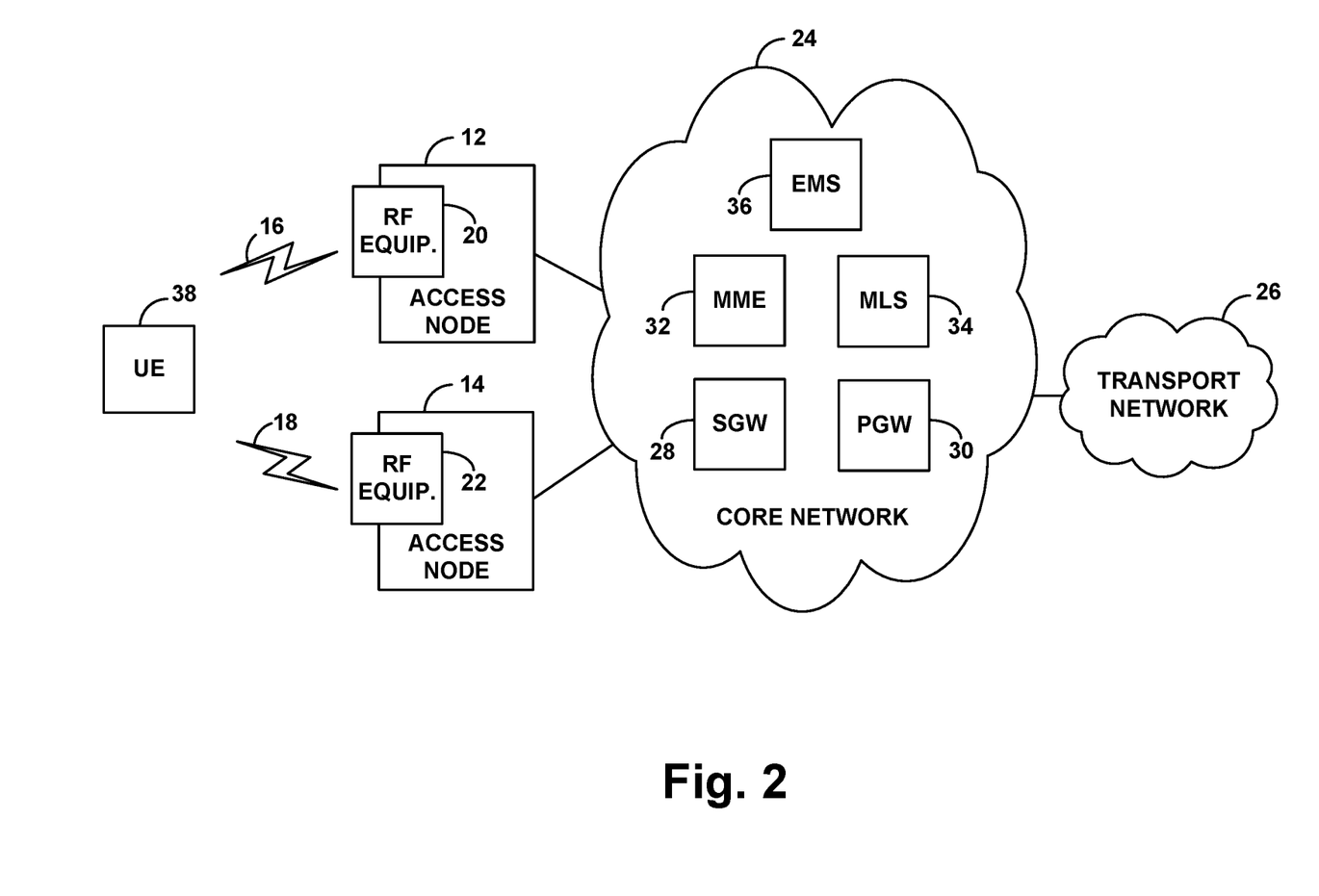
FIG. 2 is a simplified block diagram of an example wireless communication system in which features of the present disclosure can be implemented.

An example implementation will now be described in the context of a network that operates according to 4G LTE and/or 5G NR, among other possibilities. It should be understood, however, that the principles disclosed herein could extend to apply with respect to other scenarios as well, such as with respect to other RATs. Further, it should be understood that other variations from the specific arrangements and processes described are possible. For instance, various described entities, connections, functions, and other elements could be added, omitted, distributed, re-located, re-ordered, combined, or changed in other ways. In addition, it will be understood that technical operations disclosed as being carried out by one or more entities could be carried out at least in part by a processing unit programmed to carry out the operations or to cause one or more other entities to carry out the operations Referring to the drawings, FIG. 2 is a simplified block diagram of an example network arrangement having two example access nodes 12 and 14. Either or each of these access nodes could be a macro access node of the type configured to provide a wide range of coverage or could take other forms, such as a small cell access node, a relay, a femtocell access node, or the like, possibly configured to provide a smaller range of coverage. Further, the access nodes could be located nearby each other, providing overlapping coverage so that a UE could be positioned within coverage of both access nodes concurrently.

Each of these access nodes could be configured to provide coverage and service on carriers defined in multiple different frequency bands as discussed above, with the set of frequency bands on which one access node operates being the same as or different than the set of frequency bands on which the other access node operates. Thus, access node 12 could operate on carriers in multiple frequency bands 16, and access node 14 could operate on carriers in multiple frequency bands 18.

The air interface on each such carrier could be structured as described above by way of example, being divided over time into frames, subframes, timeslots, and symbol time segments, and over frequency into subcarriers, thus defining an array of air-interface resource elements grouped into PRBs allocable by the access node as noted above, for use to carry data to or from served UEs.

To facilitate operating on multiple frequency bands, as discussed above, each access node could have a separate set of RF circuitry respectively per frequency band. Namely, access node 12 could have multiple sets of RF circuitry 20 to support its operation on multiple frequency bands, and access node 14 could have multiple sets of RF circuitry 22 to support its operation on multiple frequency bands. As noted above, an access node's set of RF circuitry per frequency band could include a respective set of one more antennas that the access node uses to engage in air-interface communication on the frequency band as well as a number of other associated RF circuitry components. Cooperatively for each frequency band, this RF circuitry of an access node could define an RF chain, which could support downlink RF communication from the access node to UEs and uplink RF communication to the access node from UEs.

As noted above, each access node could also have a defined level of RF-circuitry quality respectively as to each frequency band on which the access node operates, which could differ per frequency band. This level of RF-circuitry quality per frequency band could be defined as noted above based on one or more metrics, such as port-to-port isolation and/or insertion loss, and stored for reference.

To facilitate a comparative analysis, the access node's RF circuitry quality per frequency band could be defined on a normalized quality scale established for present purposes or otherwise. That scale could make RF-circuitry-quality values proportional to level of port-to-port isolation, because a higher level of port-to-port isolation would correlate with higher RF communication quality, and/or could make RF-circuitry-quality values inversely proportional to insertion loss, because a higher level of insertion loss would correlate with lower quality. Where both of these metrics and/or other metrics are involved, the access node's RF-circuitry quality as to a given frequency band could be deemed to be an average, a weighted sum, and/or another aggregation of the metrics, among other possibilities.

As further shown in FIG. 2, each of the illustrated access nodes is interfaced with an example core network 24, which provides connectivity with an external transport network 26 such as the Internet for instance. This core network could be a packet-switched network such as an Evolved Packet Core (EPC) network or Next Generation Core (NGC) core network, among other possibilities, supporting virtual-packet tunnels or other interfaces between network nodes. And the core network could include both a user-plane subsystem through which UE bearer communications could flow to and from the transport network 26, and a control-plane subsystem supporting functions such as UE authentication, mobility management, and bearer management, among others.

In the example arrangement as shown, for instance, the core network 24 could be an EPC network and could include a serving gateway (SGW) 28, a packet data network gateway (PGW) 30, a mobility management entity (MME) 32, a mobile location system (MLS) 34, and an element management system (EMS) 36, although other arrangements are possible as well, including possibly having the access nodes interfaced with different core networks than each other.

In an example implementation, without limitation, each access node could have an interface through the core network 24 with the SGW 28, the SGW 28 could have an interface with the PGW 30, and the PGW 30 could provide connectivity with the transport network 26. In addition, each access node could have an interface through the core network 24 with the MME 32, and the MME 32 could have an interface with the SGW 28, so that the MME 32 could coordinate setup of bearers for UEs to enable the UEs to engage in packet-data communications. Alternatively, just the access node 14 might have an interface with the MME 32 and may function as an anchor for core-network control signaling with the MME 32 both for 4G service and for 5G service with EN-DC.

Further, the MLS 34 could be a computing-system platform configured to determine (e.g., track) geographic location of UEs using techniques such as trilateration, multilateration (e.g., observed time difference of arrival (OTDOA)), satellite-based positioning, or the like. And the EMS 36 could be a computing-system platform configured to operate as a central repository of operational data for the wireless communication network and to control and manage operation of various network elements.

FIG. 2 further illustrates an example UE 38 within coverage of the access nodes. This UE could be any of the types noted above, among other possibilities and could include one or more radios and associated logic that enables the UE to be served in accordance with a RAT such as one of those noted above.

In line with the discussion above, upon entering into coverage of the access nodes as shown, the UE could initially scan for coverage and could detect threshold strong coverage of an access node on a given carrier in a given band. For instance, the UE could evaluate reference signal receive power (RSRP) from the access node on the carrier and determine that that RSRP is strong enough to justify connecting. Further, if the UE detects threshold strong coverage of multiple access nodes and/or on multiple carriers, the UE might select the strongest detected coverage on which to connect.

The UE could then engage in random access signaling and RRC signaling with the access node on the detected/selected carrier, to establish an RRC connection with the access node on that carrier. Further, the UE could also engage in attach signaling with the MME 32 through the UE's connection, and the MME 32 could coordinate setup of one or more user-plane bearers for the UE as discussed above could establish in data storage a context record for the UE, indicating the UE's RRC-connected state and indicating the carrier and band on which the access node is serving the UE. And once the UE is connected, the access node could then serve the UE as noted above, scheduling downlink and uplink communication with the UE on PRBs of the carrier or carriers of the UE's RRC connection.

Note also that the access node might add one or more additional carriers to the UE's RRC connection, to facilitate providing the UE with carrier-aggregation service, with the access node scheduling communications with the UE on PRBs distributed across multiple such carriers. Although, with carrier aggregation, the UE could be considered to be connected (e.g., primarily connected) with the access node on one such carrier, perhaps the carrier on which the UE initially connected, and each added carrier would be just a secondary component carrier added to help provide the UE with increased peak data rate.

Further, note that the access node might also configure dual connectivity service for the UE, perhaps when desired to help provide the UE with increased peak data rate. Configuring of dual connectivity for the UE could involve the access node coordinating addition for the UE of a secondary connection between the UE and another access node (perhaps one operating according to a different RAT)). For instance, the access node might engage in signaling with the other access node and the UE to set up that secondary connection, and the access node might also engage in signaling to coordinate setup of a split bearer for the UE, so as to enable the access nodes to concurrently serve the UE over their respective connections with the UE.

While the UE is served by an access node on a given carrier, the UE may also regularly monitor the UE's coverage strength on that carrier and on other carriers and may provide the access node with measurement reports to enable the access node to adapt its service of the UE based at least on the UE's coverage conditions.

For instance, the UE could periodically measure and report to the access node the UE's RSRP on the carrier on which the UE is connected with the access node and/or on one or more other carriers. And the access node may also provision the UE with a measurement object that causes the UE to scan for and report to the access node when the UE's detected coverage meets certain thresholds (e.g., when the UE's serving coverage becomes threshold weak and/or when other coverage becomes threshold strong, perhaps threshold stronger than the serving coverage).

Based on these measurement reports and/or other information, as noted above, the access node may at times switch the UE from being connected with the access node on a given carrier to being connected with the access node on a different carrier. Further, as noted above, this could be a switch from serving the UE on a given frequency band to serving the UE on another frequency band. For instance, if and when the UE is connected with the access node on a carrier of a given frequency band and the access node learns that the UE is moving into threshold stronger coverage of the access node on a carrier of a different frequency band, the access node may transition the UE to be connected with the access node instead on the carrier of the different frequency band. By way of example, the access node could transmit to the UE an RRC connection reconfiguration message that directs and thus causes the UE to engage in that transition, and the access node could update its context record for the UE accordingly.

As the access node with which the UE connects operates on multiple different frequency bands, the access node would have multiple zones of coverage as noted above, which could emanate from a common point of origin (e.g., a common antenna array) but extend different distances than each other from the access node. Further, at the time the UE connects with the access node and/or later while the UE is being served by the access node, the UE may be positioned within a given such zone of coverage. And the UE may also be in motion and headed along a path (e.g., in a direction) that will lead the UE sequentially through at least some of those multiple zones of coverage, including the zone in which the UE is currently positioned. Therefore, the access node may transition the UE from frequency band to frequency band as the UE moves along.

In addition, as the other access node shown in FIG. 2 also operates on multiple different frequency bands, that other access node would also have multiple zones of coverage as noted above. And the UE's path of movement may also happen to lead the UE sequentially through at least some of those multiple zones of coverage of that other access node as well.

Figure 3:
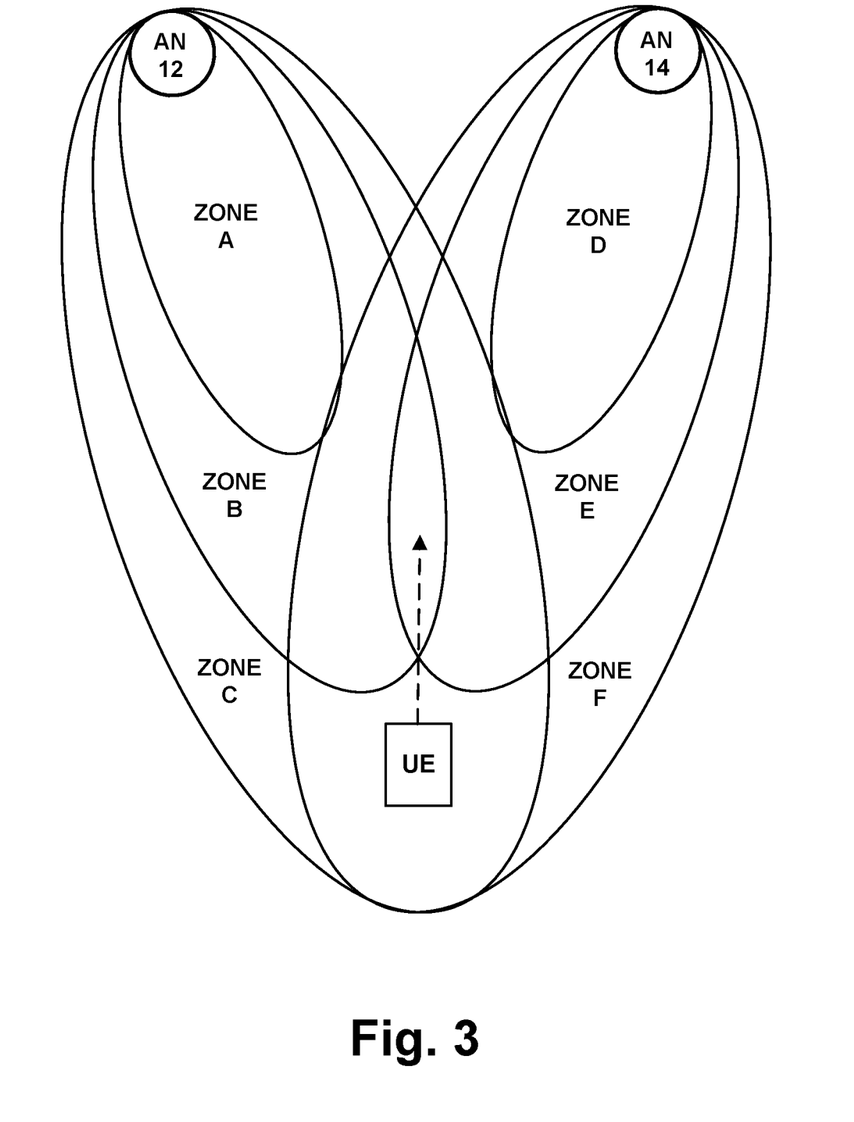
FIG. 3 is an illustration of an example arrangement where a UE is moving along a path that will lead through multiple zones of coverage of each of one or more access nodes.

FIG. 3 illustrates how this might play out in practice. Namely, FIG. 3 depicts access nodes 12 and 14 each having three representative, respective zones of coverage as discussed above, access node 12 having zones of coverage A, B and C at progressively greater distance from access node 12, and access node 14 having zones of coverage D, E, and F at progressively greater distance from access node 14. Without limitation, zones A, B, and C of access node 12 might encompass service by access node 12 on respectively sets of the frequency bands as depicted by FIG. 1, and zones D, E, and F of access node 14 might encompass service on those same respective sets of frequency bands. Each of these zones of coverage could span a respective geographic area, which could be established through drive testing or other RF mapping mechanisms and could be recorded for reference.

FIG. 3 then further depicts the example UE being positioned concurrently within zone C of access node 12 and zone F of access node 14 and moving along a path that will lead the UE in turn into zone B of access node 12 and zone E of access node 14 but not through zone A of access node 12 or zone D of access node 14.

In line with the discussion above, a computing system in this situation could predict that the UE will move sequentially through multiple zones of coverage of a given such access node, And the computing system could then proactively control whether the UE should be served by that access node, with the control being based on the RF-circuitry quality of the frequency bands on which that access node operates in the zones of coverage through which the UE is predicted to move.

The computing system that carries out this process could be provided at the access node at issue (e.g., by a programmed host processor or other processor of that access node) or elsewhere, such as the EMS 36 for instance.

And to facilitate this process, the computing system could have access to a set of reference data that defines the zones of coverage, frequency bands, and levels of RF-circuitry quality. For instance, the reference data could indicate, respectively per access node, the access node's zones of coverage and, respectively for each zone of coverage, both the geographic scope of the zone of coverage and the set of one or more frequency bands on which the access node operates in the zone of coverage. Further, the reference data could indicate, respectively for each frequency band on which the access node operates, an RF-circuitry quality of the access node as to that frequency band, perhaps based on port-to-port isolation and/or insertion loss of the access node for instance.

To predict that the UE will move sequentially through multiple zones of coverage of a given such access node, the computing system could (i) determine a path along which the UE is headed and (ii) compare that path to the reference-data indication of geographic scope of the access node's zones of coverage.

The computing system could determine the path along which the UE is headed based on geolocation tracking data. For instance, through interaction with the MLS 34 or in other ways, the computing system could track the UE's geographic location over time as a series of geographic location points, which could establish a direction or other path of movement of the UE from a current geographic position of the UE, and the computing system could extrapolate that path to predict where it will lead. Further, the computing system could take into account other factors as a basis to determine the UE's path of movement, such as for instance the UE's movement along a roadway or other predefined path, as well as previous handover data or the like, and the computing system might factor in speed and other variance of movement of the UE over time.

Given the determined path along which the UE is predicted to move, the computing system could compare that path with the geographic scope of coverage of the various zones of coverage of the access node, to determine a sequence of zones of coverage of the access node through which the path leads and thus through which the UE will move, which may start with the zone in which the UE is currently positioned and continue with one or more additional zones.

Given the set of the access node's zones of coverage through which the UE is predicted to move, the computing system could then determine an RF-circuitry-quality score of the access node as an aggregate of the RF-circuit-qualities of the access node as to the frequency bands on which the access node operates in the zones of coverage through which the UE is predicted to move.

For instance, the computing system could determine from the reference data an aggregate set of frequency bands on which the access node operates in the zones of coverage through which the UE is predicted to move, by (i) determining for each such zone of coverage the set of one or more frequency bands on which the access node operates, and (ii) aggregating those determined frequency bands to establish an aggregate set of the frequency bands on which the access node operates in the zones of coverage through which the UE is predicted to move. And the computing system could then determine the RF-circuitry-quality score of the access node as to that determined aggregate set of frequency bands.

The computing system could determine the RF-circuitry-quality score of the access node as to the set of frequency bands on which the access node operates in the zones of coverage through which the UE is predicted to move by (i) determining, respectively for each frequency band of the aggregate set of frequency bands, the RF-circuitry quality of the access node as to that frequency band and (ii) aggregating those determined RF-circuitry qualities, such as by averaging them or otherwise rolling them up to establish for the access node a representative RF-circuitry quality score.

The computing system could then use that determined RF-circuit-quality score of the access node as a basis to control whether the UE is served by the access node. For instance, if the UE is already connected with the access node, the computing system could use the determined RF-circuit-quality score of the access node as a basis to determine whether the UE should stay connected with the access node or should rather transition to be served by a different access node. Or if the UE is not already connected with the access node, the computing system could use the determined RF-circuit-quality score of the access node as a basis to determine whether the UE should connect with the access node.

As an example of this process, consider a scenario where the UE in the arrangement of FIG. 3 is currently connected with access node 12 and is not connected with access node 14.

In that scenario, the computing system might use this process to control whether the UE will stay connected with access node 12. For instance, the computing system could predict that the UE will head along a path that will lead the UE through zones C and B of access node 12, and the computing system could determine that the aggregate set of frequency bands on which access node 12 operates in those determined zones is band 71 and band 41.

The computing system might then determine an example RF-circuitry-quality score of access node 12 as a value proportional to the average port-to-port isolation of the access node on those two bands, and/or the computing system might determine as an example RF-circuitry-quality score of the access node 12 as a value inversely proportional to the average insertion loss of the access node on those two bands. And the computing system could compare that determined RF-circuitry-quality score of the access node with a predefined threshold RF-circuitry-quality level defined for present purposes.

If the determined RF-circuitry-quality score of access node 12 is at least as high as the predefined threshold, then the computing system could determine that the UE should continue to be served by access node 12. In that case, the computing system could allow the UE's service to continue as is. Whereas, if the determined RF-circuitry-quality score is not as high as the predefined threshold, then the computing system could determine that the UE should not continue to be served by the access node 12, perhaps that the UE should be served by another access node instead. And in that case, the computing system could cause access node 12 to release the UE's connection and perhaps to hand the UE over to another access node such as access node 14.

As another example, in a similar scenario, the access node might perform such an analysis respectively for each of access nodes 12 and 14, based on the UE's predicted path of movement and may thereby determine respectively per access node an RF-circuitry-quality score and use a comparison of those scores as a basis to determine whether access node 12 should hand the UE over to access node 14, such as by determining that the UE should be served by the access node that has the higher determined RF-circuitry-quality score.

For instance, if the computing system determines that the RF-circuitry-quality score of access node 12 as an aggregate of the RF-circuit qualities of access node 12 as to the frequency bands on which access node 12 operates in zones C and B through which the UE is predicted to move is greater than the RF-circuitry-quality score of access node 14 as an aggregate of the RF-circuitry qualities of access node 14 as to the frequency bands on which access node 14 operates in zones F and E through which the UE is predicted to move, then the computing system could conclude that the UE should stay served by access node 12. And in that case, the computing system could cause access node 12 to forgo from handing over the UE to access node 14 or otherwise to not do so.

Whereas, if the computing system determines that the RF-circuitry-quality score of access node 12 is lower than the RF-circuitry-quality score of access node 14, then the computing system could conclude that the UE should hand over from access node 12 to access node 14. And in that case, the computing system could cause access node 12 to so hand over the UE.

In an example implementation, if the computing system is at access node 12 in these examples, then the computing system could directly cause the access node to execute the control decision. Whereas, if the computing system is elsewhere, then the computing system could transmit to access node 12 a control signal to which access node 12 is configured to respond by executing the control decision.

Further, note that various triggers could exist for carry out this process.

By way of example, the computing system could carry out this process in response to detecting the occurrence of a trigger for the UE to be provided with dual-connectivity. For instance, access node 12 might detect that the UE is engaged in video streaming or other data-heavy communication and could benefit from being served with dual connectivity. To help ensure that the UE in that situation would have an optimal anchor carrier connection for dual connectivity, access node 12 could then engage the present process to determine whether to continue serving the UE as that anchor or rather to hand the UE over to access node 14 to be the UE's anchor.

As another example, the computing system could carry out the process in response to a first determination that the UE has transitioned from one zone of coverage of an access node to another zone of coverage of the access node, and thus that the UE is in motion. Other examples are possible as well.

Figure 4:
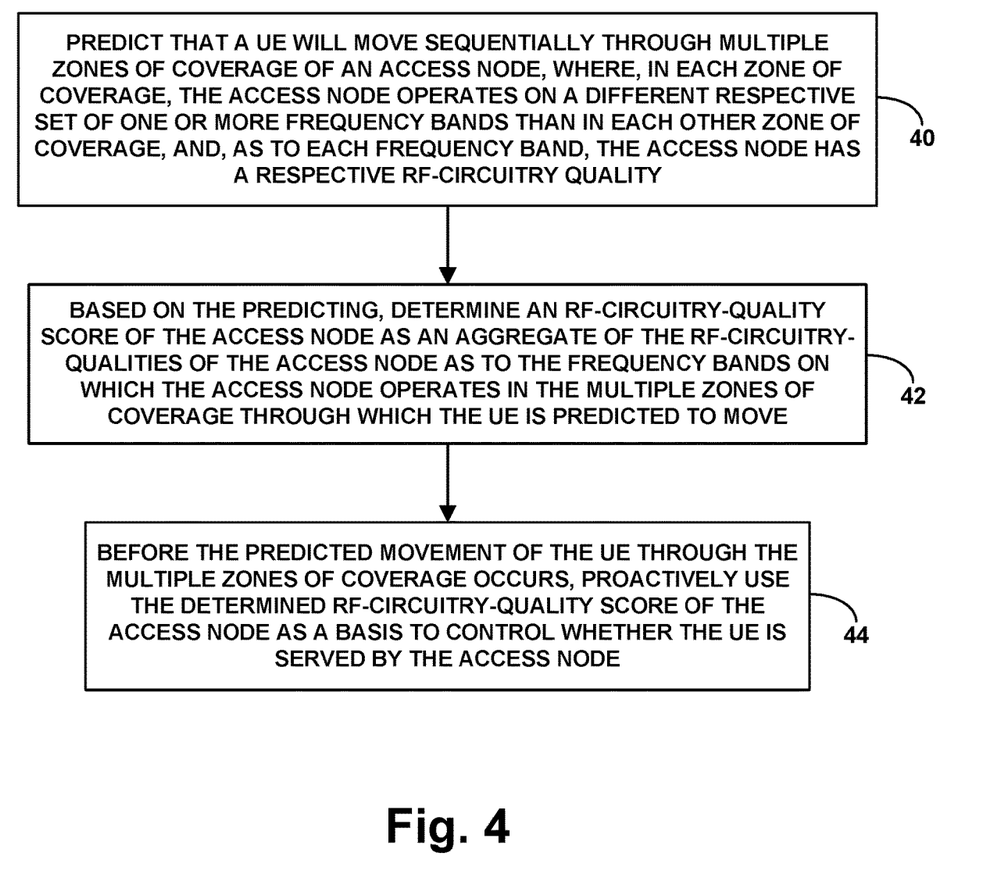
FIG. 4 is a flow chart depicting operations that can be carried out in accordance with the disclosure.

FIG. 4 is next a flow chart depicting a method that could be carried out in accordance with the present disclosure to control service of a UE. As shown in FIG. 4, at block 40, the method includes predicting that the UE will move sequentially through multiple zones of coverage of an access node, where, in each zone of coverage, the access node operates on a different respective set of one or more frequency bands than in each other zone of coverage, and, as to each frequency band, the access node has a respective RF-circuitry quality. At block 42, the method then includes, based on the predicting, determining an RF-circuitry-quality score of the access node as an aggregate of the RF-circuitry-qualities of the access node as to the frequency bands on which the access node operates in the multiple zones of coverage through which the UE is predicted to move. And at block 44, the method includes, before the predicted movement of the UE through the multiple zones of coverage occurs (i.e., before that movement has fully occurred), proactively using the determined RF-circuitry-quality score of the access node as a basis to control whether the UE is served by the access node.

Figure 5:
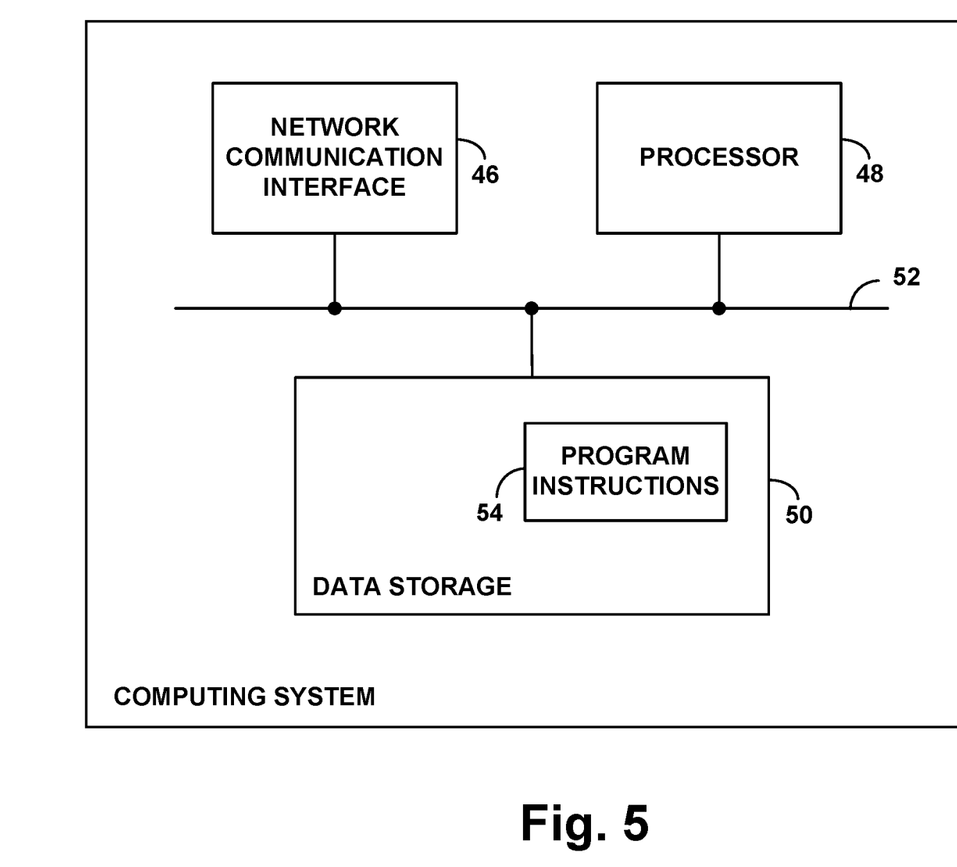
FIG. 5 is a simplified block diagram of an example computing system operable in accordance with the disclosure.

FIG. 5 is next a simplified block diagram of an example computing system that could be operable in accordance with the present disclosure. As noted above, such a computing system could be provided at an access node or the EMS 36, among other possibilities.

As shown in FIG. 5, the example computing system includes at least one network communication interface 46, at least one processor 48, and at least one non-transitory data storage 50, which could be integrated together and/or interconnected by a system bus, network, or other connection mechanism 52.

The at least one network communication interface 46 could comprise a physical network connector (e.g., an Ethernet interface) and associated communication logic (e.g., protocol stacks) to facilitate wired or wireless network communication with various other entities. The at least one processor 48 could comprise one or more general purpose processors (e.g., microprocessors) and/or one or more specialized processors (e.g., application specific integrated circuits). And the at least one non-transitory data storage 50 could comprise one or more volatile and/or non-volatile storage components (e.g., magnetic, optical, or flash storage, necessarily non-transitory).

As shown, the at least one non-transitory data storage 50 could then store program instructions 54. These program instructions could be executable by the at least one processor 48 to cause the computing system to carry out various operations described herein to control service of a UE. By way of example, the operations could include (i) predicting that the UE will move sequentially through multiple zones of coverage of an access node, where, in each zone of coverage, the access node operates on a different respective set of one or more frequency bands than in each other zone of coverage, (ii) determining an RF-circuitry-quality score based on RF-circuitry qualities of the frequency bands on which the access node operates in the multiple zones of coverage that the UE is predicted to move through, and (iii) before the predicted movement of the UE through the multiple zones of coverage occurs, using the determined RF-circuitry-quality score as a basis to control whether the UE should be served by the access node.

Various other features described herein could be carried out in this context as well, and vice versa.

The present disclosure also contemplates at least one non-transitory computer readable medium (e.g., one or more magnetic, optical, of flash storage components, necessarily non-transitory) having stored thereon (e.g., being encoded with) or otherwise containing program instructions executable by a processor to carry out various operations as described herein.

Exemplary embodiments have been described above. Those skilled in the art will understand, however, that changes and modifications may be made to these embodiments without departing from the true scope and spirit of the invention.

What is claimed is:

1. A method to control service of a user equipment device (UE), the method comprising:
    predicting that the UE will move sequentially through multiple zones of coverage of an access node, wherein, in each zone of coverage, the access node operates on a different respective set of one or more frequency bands than in each other zone of coverage, and wherein, as to each frequency band, the access node has a respective radio-frequency (RF) circuitry quality;
    based on the predicting, determining an RF-circuitry-quality score of the access node as an aggregate of the RF-circuitry-qualities of the access node as to the frequency bands on which the access node operates in the multiple zones of coverage through which the UE is predicted to move; and
    before the predicted movement of the UE through the multiple zones of coverage occurs, proactively using the determined RF-circuitry-quality score of the access node as a basis to control whether the UE is served by the access node.

2. The method of claim 1, wherein the respective RF-circuitry quality of the access node per frequency band is based on at least one metric selected from the group consisting of (i) port-to-port isolation of the access node as to communication of the access node on the frequency band and (ii) insertion loss of the access node as to communication of the access node on the frequency band.

3. The method of claim 1, wherein predicting that the UE will move sequentially through the multiple zones of coverage of the access node comprises determining that the UE is moving along a path that leads from a current position of the UE through the multiple zones of coverage of the access node.

4. The method of claim 3, wherein the determining that the UE is moving along the path is based on geolocation tracking data.

5. The method of claim 1, wherein determining the RF-circuitry-quality score of the access node as the aggregate of the RF-circuitry-qualities of the access node as to the frequency bands on which the access node operates in the multiple zones through which the UE is predicted to move comprises:
    determining an aggregate set of the frequency bands on which the access node provides service in the multiple zones of coverage through which the UE is predicted to move, as a union of sets of one or more frequency bands respectively per zone of coverage;

determining the RF-circuitry quality of the access node respectively for each frequency band of the determined aggregate set; and aggregating, as the RF-circuitry-quality score, the determined RF-circuitry qualities of the frequency bands of the determined aggregate set.

6. The method of claim 5, wherein aggregating the determined RF-circuitry qualities of the frequency bands of the determined aggregate set comprises averaging the determined RF-circuitry qualities of the frequency bands of the determined aggregate set.

7. The method of claim 1, wherein proactively using the determined RF-circuitry-quality score of the access node as a basis to control whether the UE is served by the access node comprises:

comparing the determined RF-circuitry-quality score of the access node with a predefined threshold level of RF-circuitry quality; and based on the comparing, controlling whether the UE is served by the access node.

8. The method of claim 1, wherein the access node is a first access node and the determined RF-circuitry-quality score is a first determined RF-circuitry-quality score, and wherein proactively using the first determined RF-circuitry-quality score of the first access node as a basis to control whether the UE is served by the first access node comprises:

comparing the first determined RF-circuitry-quality score of the first access node with a second determined RF-circuitry-quality score of a second access node that also provides multiple zones of coverage through which the UE is predicted to move; and based on the comparing, controlling whether the UE is served by the first access node or rather the second access node.

9. The method of claim 8, wherein controlling, based on the comparing, whether the UE is served by the first access node or rather the second access node comprises:

determining, based on the comparing, which of the first access node and the second access node has a higher determined RF-circuitry-quality score than the other of the first access node and the second access node; and based on the determining of which access node has the higher determined RF-circuitry-quality score, causing the UE to be served by the determined access node.

10. The method of claim 1, wherein the method is carried out when the UE is already served by the access node, and wherein proactively using the determined RF-circuitry-quality score of the access node as a basis to control whether the UE is served by the access node comprises using the determined RF-circuitry-quality score of the access node as a basis to control whether (i) the UE continues to be served by the access node or rather (ii) to hand over the UE from the access node to another access node.

11. The method of claim 1, wherein the method is carried out when the UE is not currently served by the access node, and wherein proactively using the determined RF-circuitry-quality score of the access node as a basis to control whether the UE is served by the access node comprises using the determined RF-circuitry-quality score of the access node as a basis to control whether or not to hand over the UE to the access node.

12. The method of claim 1, wherein the method is carried out in response to detecting a trigger for the UE to be provided with dual-connectivity service.

13. The method of claim 1, wherein the multiple zones of coverage of the access node emanate from a common point of origin and extend different distances than each other from the access node.

14. A computing system configured to control service of a user equipment device (UE), the computing system comprising:

at least one processor;

at least one non-transitory data storage; and program instructions stored in the at least one non-transitory data storage and executable by the at least one processor to cause the computing system to carry out operations including:

predicting that the UE will move sequentially through multiple zones of coverage of an access node, wherein, in each zone of coverage, the access node operates on a different respective set of one or more frequency bands than in each other zone of coverage, determining a radio-frequency (RF) circuitry quality score based on RF-circuitry qualities of the frequency bands on which the access node operates in the multiple zones of coverage that the UE is predicted to move through, and before the predicted movement of the UE through the multiple zones of coverage occurs, using the determined RF-circuitry-quality score as a basis to control whether the UE should be served by the access node.

15. The computing system of claim 14, wherein predicting that the UE will move sequentially through the multiple zones of coverage of the access node comprises determining that the UE is moving along a path that leads from a current position of the UE through the multiple zones of coverage of the access node.

16. The computing system of claim 14, wherein the RF-circuitry qualities comprise at least one characteristic selected from the group consisting port-to-port isolation and insertion loss.

17. The computing system of claim 14, wherein the access node is a first access node, and wherein using the determined RF-circuitry-quality score as a basis to control whether the UE should be served by the first access node comprises using the determined RF-circuitry-quality score as a basis to control whether the UE should be served by the first access node or rather by a second access node.

18. The computing system of claim 17, wherein using the determined RF-circuitry-quality score as a basis to control whether the UE should be served by the first access node or rather by the second access node comprises:

comparing the determined RF-circuitry-quality score of the first access node with an RF-circuitry-quality score of the second access node;

based on the comparing, determining which of the first access node and second access node has a higher determined RF-circuitry-quality score than the other of the first access node and second access node; and based on the determining of which access node has the higher determined RF-circuitry-quality score, causing the UE to be served by the determined access node.

19. The computing system of claim 14, wherein the computing system is provided at the access node or at another access node.

20. A non-transitory computer-readable medium embodying program instructions executable by a processing unit to carry out operations for controlling service of a user equipment device (UE), the operations including:

predicting that the UE will move sequentially through multiple zones of coverage of an access node, wherein, in each zone of coverage, the access node operates on a different respective set of one or more frequency bands than in each other zone of coverage, and wherein, as to each frequency band, the access node has a respective radio-frequency (RF) circuitry quality;

based on the predicting, determining an RF-circuitry-quality score of the access node as an aggregate of the RF-circuitry-qualities of the access node as to the frequency bands on which the access node operates in the multiple zones of coverage through which the UE is predicted to move; and before the predicted movement of the UE through the multiple zones of coverage occurs, proactively using the determined RF-circuitry-quality score of the access node as a basis to control whether the UE is served by the access node.

\* \* \* \* \*